(12) United States Patent
Bassam et al.

(10) Patent No.: US 6,461,698 B1
(45) Date of Patent: Oct. 8, 2002

(54) POLYESTER COMPOSITIONS

(75) Inventors: Farideh Bassam; Michael David Thompson; Barry Woodfine, all of Guildford (GB)

(73) Assignee: Kabushiki Kaisha Kobe Seiko Sho (Kobe Steel, Ltd), Kobe (JP)

( * ) Notice: Subject to any disclaimer, the term of this patent is extended or adjusted under 35 U.S.C. 154(b) by 0 days.

(21) Appl. No.: 09/646,750

(22) PCT Filed: Mar. 19, 1999

(86) PCT No.: PCT/GB99/00868
§ 371 (c)(1),
(2), (4) Date: Sep. 22, 2000

(87) PCT Pub. No.: WO99/48977
PCT Pub. Date: Sep. 30, 1997

(30) Foreign Application Priority Data

Mar. 26, 1998 (GB) .............................................. 9806537

(51) Int. Cl.$^7$ .............................................. C08L 67/02
(52) U.S. Cl. ................... 428/35.7; 428/36.92; 524/449; 524/451; 524/539; 524/605; 525/444; 528/305
(58) Field of Search .................. 525/444; 528/305; 524/449, 451, 539, 605; 428/35.7, 36.92

(56) References Cited

U.S. PATENT DOCUMENTS 5,663,282 A * 9/1997 Todt
5,688,874 A * 11/1997 Hoffman

FOREIGN PATENT DOCUMENTS

FR   2193853   2/1974

OTHER PUBLICATIONS

Chemical Abstracts, vol. 118, No. 16, Apr. 19 1993, Columbus, Ohio, U.S.; abstract No. 149052, XP002108001.
Chemical Abstracts, vol. 123, No 6, Aug. 7, 1995, Columbus, Ohio, U.S.; abstract No. 58094, XP002108002.
Chemical Abstracts, vol. 122, No 18, May 1, 1995, Columbus, Ohio, U.S.; abstract No. 215880, XP002108003.
Chemical Abstracts, vol. 125, No. 26, Dec. 23, 1996, Columbus, Ohio, U.S.; abstract No. 331118, XP002108004.
X. Lu, et al.: "Crystallization Of Random Copolymers Of Poly(Ethylene Terephthalate) And Poly(Ethylene Naphthalene–2, 6–Dicarboxylate)", Polymer, vol. 36, No. 3, Jan. 1, 1995, p. 451–459 XP004025978.
M. Guo, et al.: "Structure And Properties Of Naphthalene–Containing Polyesters. 2 Miscibility Studies Of Poly(Ethylene Naphthalene–2, 6–Dicarboxylate) With Poly(Butylene Terephthalate) By 13C CP/MAS NMR And DSC", Marcromolecules, vol. 30, No. 9, May 5, 1997, pp. 2746–2750, XP000688346.
Chun–Shang Wang, et al.: "Crystallization Kinetics And Multiple Metling Point Phenomena Of Polybutylene Naphthalate Terephthalate (PBNT) Copolyesters", Polymer Bulletin, vol. 39, No. 2, Aug. 1, 1997, pp. 185–192, XP000721166.
A. Misera, et al.: Journal Of Polymer Science: Part B: Polymer Physics, vol. 24, 1986, pp. 983–997, XP002108000.
Nadka Avramova, "Amorphous Blends Of Poly(Ethylene Terephthalate) And Poly(Butylene Terephthalate) Through Ultraquenching", Polymrs And Polymer Composites, vol. 2, No. 5, Jan. 1, 1994, pp. 277–285, XP000475036.

* cited by examiner

*Primary Examiner*—Patricia A. Short
(74) *Attorney, Agent, or Firm*—Oblon, Spivak, McClelland, Maier & Neustadt, P.C.

(57) ABSTRACT

The invention relates to a composition comprising from 20 to 70 parts by weight of poly[ethylene terephthalate] (PET), from 20 to 70 parts by weight of poly[ethylene naphthalate] (PEN) and from 10 to 33 parts by weight of poly[butylene terephthalate] (PBT), the total being 100 parts by weight, in the form of a polymer blend and/or copolymer.

16 Claims, No Drawings

POLYESTER COMPOSITIONS

This invention relates to polyester compositions, and more particularly to compositions containing poly[ethylene naphthalate] (PEN), polyt[ethylene terephthalate] (PET) and poly[butylene terephthalate] (PBT) which display excellent crystallisation behaviour, useful for improved processing and moulding characteristics.

It is known that medium content PET/PEN compositions (compositions with PET:PEN ratios around 50:50) are usually amorphous in nature. Tile range of compositions which display this amorphous behaviour is generally accepted to be around PET:PEN=20:80 to PET:PEN=80:20, as described by two PEN manufacturers - Shell (see FIG. 1 of presentation to "BevPak" conference, Spring 1995, USA) and Hoechst-Trevira (page 4 of Polyclear® N technical literature). The same observations on the amorphous/crystalline nature of PET/PEN compositions were also made by Lu and Windle (see FIG. 2 in Polymer 36 (1995), pages 451–459) and Andresen and Zachmann (Colloid & Polymer Science 272 (1994), page 1352).

The disadvantages of this behaviour are that the use temperature of compositions in the 80/20–20/80 region is substantially reduced and tile mechanical properties may be compromised. These drawbacks arise from the difference in behaviour of the amorphous phase and the semi-crystalline phase in different PET/PEN compositions. In the case of bottle manufacture using PET/PEN copolymers and blends, U.S. Pat. No. 5,628,957 (to Continental PET Technologies Inc.) states that mid-range PET/PEN compositions containing 20–80% PEN are substantially amorphous and describes the use of an additional strain-hardeniable (ie. ciystallisable) layer for these mid-range PET/PEN bottles.

It would be advantageous therefore to be able to nucleate these medium content PET/PEN compositions to take advantage of the higher thermal capability and mechanical properties offered by a semi-crystalline PET/PEN composition in the otherwise amorphous 80/20–20/80 region.

In contrast to PET/PEN behaviour, PEN/PBT compositions possess crystallinity across the entire composition range, as shown by the work of Guo and Zachmann (Polymer Preprints (ACS, Division of Polymer Chemistry) 37 (1996), pages 829–830). Crystalline melt temperatures (Tm) are observed for both the PEN and PBT components, varying with composition. However, no suggestion is made in this article relating to the inclusion of PET in PEN/PBT blends as in the present invention.

PET/PBT compositions also show crystallinity across a wide composition range, including 50:50 compositions, as documented in GB 1,398,598 (to General Electric) for example. This document presents Tm values for either PET or PBT or a PET/PBT alloy. However, once again no mention is made of the inclusion of PEN polymer to produce a PET/PEN/PBT composition of the present invention.

Hence, the use of PBT to promote crystallinity development in typically amorphous medium content PET/PEN compositions has not been reported before. We have found that PBT can be used for this purpose. Furthermore, the effectiveness of PBT is surprisingly high—even medium content PET/PEN compositions in the 50/50 region undergo crystallisation so readily following the addition of PBT that a wide range of PET/PEN/PBT compositions possess a higher crystallisation temperature than unmodified PET.

The present invention provides a composition comprising from 20 to 70 parts by weight of polyethylene tereplitlialate] (PET), from 20 to 70 parts by weight of poly[ethylene naphthalate] (PEN) and from 10 to 33 parts by weight of poly[butylene terephthalate] (PBT), the total being 100 parts by weight, in the form of a polymer blend and/or copolymer.

The invention also provides use of PBT to promote crystallisation in a composition comprising PET and PEN, in the form of a polymer blend and/or copolymer.

The composition comprising PET, PEN and PBT undergoes fast crystallisation on cooling from the melt.

The proportion of each polyester in the composition is in the range 20–70 parts for PEN, 20–70 parts for PET and 10–33 parts for PBT where the total proportion in the composition as a whole is 100 parts. The content of PBT is preferably 10 to 25, more preferably 15 to 20 parts by weight.

In some applications, it is common practice to modify PET and PBT structures by introducing a small proportion of alternative monomer in place of the ethylene glycol, butylene glycol or terephthalic acid monomers which are the constituent monomers of PET and PBT. Examples of such alternative monomers include isophtlialic acid, cycloliexane dimethanol and the like. In the present invention, PET is specified to consist of >90 mole % ethylene units and >90 mole % terephlithalate units. Similarly, PBT is specified to consist of >90 mole % butylene units and >90 mole % terephthalate units.

The PEN is preferably polyl[ethylene naphthalene-2,6-dicarboxylate].

The PET:PEN mole ratio is generally from 20:80 to 80:20, preferably from 40:60 to 60:40.

Compositions of the invention display crystallisation on cooling from the melt at all PET/PEN/PBT ratios. This is advantageous in both processing, where faster cycle times may be used, and in the properties of the final product on which the overall level and type of crystallinity impinges. These propelties may include heat distortion temperature, hot-fill temperature, mechanical properties, barrier properties, dimensional stability, mould release, surface appearance and the like. The fact that PBT is a polymer rather than a heterogeneous nucleating additive means that obtaining good mixing with PET and PEN polymers presents no problems, especially when compared with the care that has to taken to obtain good mixing with heterogeneous nucleating additives.

The compositions may consist essentially of the PET, PEN and PBT.

The use of common additives, typically at levels up to 1 wt %, does not unduly effect the behaviour of the compositions of the invention. Such additives include process additives such as flow modifiers and the like and product-dependent additives such as pigments and the like. The invention is also effective for filled compositions containing fibrous or particulate fillers including materials such as glass fibres, carbon fibres, mica, carbon black, talc and the like.

The composition can be formed into shaped products, e.g. moulded articles such as bottles, and also fibres and films. Compositions for bottles may contain dyes at less than 1 wt % but generally no other additives. Compositions for fibres or films may contain dyes at less than 1 wt %, processing aids at less than 2 wt % and fillers at less than 10 wt %, generally less than 5 wt %. (all percentages based on total weight).

The invention is illustrated by the following Examples.

COMPARATIVE EXAMPLES 1–9 AND EXAMPLES 10–13

Example materials of composition as detailed in Table 1 were prepared by twin screw extrusion. The extruded material was then moulded into appropriate test specimens by a twinl screw injection moulding machine. Mechanical testing (modulus, strength) was carried out on an Instron testing machine according to standard test ASTM D-638. The materials were tested for their crystallisation characteristics by DSC (differential scanning calorimetry) measurements. The peak temperature at which crystallinity developed in the material whilst cooling the material from the melt at a rate of 10° C./minute was determined. The results of all the tests and experiments are presented in Table 2.

Abbreviations used in the Tables are as follows:

PEN —poly[ethylene naphthalate]
PET —poly[ethlene terephthalate]
PBT —poly[butylene terephthalate]

TABLE 1

| Example | PEN content | PET content | PBT content |
|---|---|---|---|
| 1 | 100 | 0 | 0 |
| 2 | 0 | 100 | 0 |
| 3 | 0 | 0 | 100 |
| 4 | 70 | 30 | 0 |
| 5 | 50 | 50 | 0 |
| 6 | 30 | 70 | 0 |
| 7 | 70 | 0 | 30 |
| 8 | 50 | 0 | 50 |
| 9 | 30 | 0 | 70 |
| 10 | 33 | 33 | 33 |
| 11 | 66 | 16.5 | 16.5 |
| 12 | 16.5 | 66 | 16.5 |
| 13 | 16.5 | 16.5 | 66 |
| 14 | 45 | 45 | 10 |
| 15 | 42.5 | 42.5 | 15 |
| 16 | 40 | 40 | 20 |
| 17 | 54 | 36 | 10 |
| 18 | 36 | 54 | 10 |
| 19 | 51 | 34 | 15 |
| 20 | 34 | 51 | 15 |

TABLE 2

| Example | Modulus (GPa) | Strength (MPa) | Crystallisation temperature on cooling from the melt (° C.) |
|---|---|---|---|
| 1 | 2.56 | 66.6 | 218 |
| 2 | 2.29 | 49.0 | 179 |
| 3 | 2.68 | 55.2 | 192 |
| 4 | 2.35 | 56.9 | 105 |
| 5 | 2.22 | 50.4 | 99 |
| 6 | 2.27 | 54.4 | 89 |
| 7 | 2.44 | 62.6 | 215 |
| 8 | 2.43 | 27.2 | 213 |
| 9 | 2.57 | 44.5 | 197 |
| 10 | 2.23 | 25.6 | 185 |
| 11 | 2.30 | 47.0 | 188 |
| 12 | 2.20 | 52.5 | 187 |
| 13 | 2.60 | 56.1 | 186 |
| 14 | 2.15 | 45.2 | 162 |
| 15 | 2.20 | 42.7 | 175 |
| 16 | 2.27 | 43.9 | 181 |
| 17 | 2.23 | 46.0 | 170 |
| 18 | 2.17 | 44.8 | 169 |
| 19 | 2.26 | 43.1 | 179 |
| 20 | 2.19 | 44.6 | 172 |

What is claimed is:

1. A composition, comprising:
    (a) from 20 to 70 parts by weight of poly(ethylene terephthalate) units;
    (b) from 20 to 70 parts by weight of poly(ethylene naphthalate) units; and
    (c) from 16.5 to 33 parts by weight of poly(butylene terephthalate) units;
    wherein a sum of (a), (b) and (c) is 100 parts by weight; and
    wherein said composition is in the form of a polymer blend and/or copolymer.

2. The composition according to claim 1, containing from 16.5 to 25 parts by weight of said poly(butylene terephthalate) units.

3. The composition according to claim 1, in which a molar ratio of said poly(ethylene terephthalate) units to said poly(ethylene naphthalate) units is from 20:80 to 80:20.

4. The composition according to claim 3, wherein said mol ratio of poly(ethylene terephthalate) units to poly(ethylene naphthalate) units is 40:60 to 60:40.

5. The composition according to claim 1, containing from 16.5 to 20 parts by weight of poly(butylene terephthalate) units.

6. The composition according to claim 1, wherein said poly(ethylene terephthalate) units or said poly(butylene terephthalate) units are modified with isophthalic acid or cyclohexane dimethanol.

7. The composition according to claim 1, wherein said poly(ethylene naphthalate) units are poly(ethylene naphthalene-2,6-dicarboxylate) units.

8. The composition according to claim 1, further comprising up to 1 wt % of an additive selected from the group consisting of a flow modifier, a pigment, a fibrous filler and a particulate filler.

9. The composition according to claim 8, wherein said fibrous filler or said particulate filler is selected from the group consisting of a glass fiber, a carbon fiber, mica, carbon black and talc.

10. A shaped product formed from the composition according to claim 1.

11. The shaped product according to claim 10, which is a bottle, a fiber or a film.

12. The shaped product according to claim 10, further comprising less than 1 wt % of a dye.

13. The shaped product according to claim 10, further comprising less than 1 wt % of a dye, less than 2 wt % of a processing aid and less than 10 wt % of a filler.

14. A method of preparing a composition, comprising:
    adding poly(butylene terephthalate) to a polymer blend of poly(ethylene terephthalate) and poly(ethylene naphthalate) or a copolymer of poly(ethylene terephthalate) and poly(ethylene naphthalate) or a combination thereof, to obtain a composition comprising
    (a) from 20 to 70 parts by weight of poly(ethylene terephthalate) units;
    (b) from 20 to 70 parts by weight of poly(ethylene naphthalate) units; and
    (c) from 16.5 to 33 parts by weight of poly(butylene terephthalate) units;
    wherein a sum of (a), (b) and (c) is 100 parts by weight.

15. The method according to claim 14, wherein said polymer blend is extruded.

16. The method according to claim 14, wherein a crystallization temperature of said composition on cooling form the melt is 181 to 188° C.

* * * * *

UNITED STATES PATENT AND TRADEMARK OFFICE
CERTIFICATE OF CORRECTION

PATENT NO.    : 6,461,698 B1
DATED         : October 8, 2002
INVENTOR(S)   : Bassam et al.

It is certified that error appears in the above-identified patent and that said Letters Patent is hereby corrected as shown below:

<u>Title page,</u>
Item [87], PCT Publication Date should read:

-- [87]  PCT Pub. No.:  WO99/48977

PCT Pub. Date: Sep. 30, 1999 --

Signed and Sealed this

Seventh Day of January, 2003

JAMES E. ROGAN
*Director of the United States Patent and Trademark Office*